United States Patent [19]

Uhde et al.

[11] Patent Number: 4,803,408
[45] Date of Patent: Feb. 7, 1989

[54] BRUSHLESS DC MOTOR SYSTEM WITH OPTICALLY SCANNABLE MEMBER FOR COMMUTATION

[75] Inventors: Dietmar Uhde, Königsfeld; Günter Gleim, AVS-Villingen; Hartmut Schandl, Villingen; Peter Hoch, Triberg; Rüdiger Lehmann, St. Georgen, all of Fed. Rep. of Germany

[73] Assignee: Deutsche Thomson-Brandt GmbH, Villingen-Schwenningen, Fed. Rep. of Germany

[21] Appl. No.: 13,435

[22] Filed: Feb. 11, 1987

[30] Foreign Application Priority Data

Feb. 11, 1986 [DE] Fed. Rep. of Germany ....... 3604238

[51] Int. Cl.⁴ ............................................ H02K 29/10
[52] U.S. Cl. ................................................... 318/254
[58] Field of Search ............... 318/138, 254, 439, 480

[56] References Cited

U.S. PATENT DOCUMENTS

| | | | |
|---|---|---|---|
| 3,569,804 | 3/1971 | Studer | 318/254 X |
| 3,577,053 | 5/1971 | McGee | 318/254 |
| 3,581,173 | 5/1971 | Hood | 318/254 |
| 4,197,489 | 4/1980 | Dunn et al. | 318/254 X |
| 4,228,384 | 10/1980 | Arnold, Jr. et al. | 318/254 |
| 4,273,334 | 6/1981 | Schöne et al. | 318/480 X |
| 4,511,797 | 4/1985 | Pohlig et al. | 318/480 X |
| 4,529,900 | 7/1985 | Uzuka | 310/43 |

FOREIGN PATENT DOCUMENTS

| | | |
|---|---|---|
| 7029840 | 8/1970 | Fed. Rep. of Germany . |
| 2424254 | 4/1976 | Fed. Rep. of Germany . |
| 0127141 | 9/1977 | German Democratic Rep. . |
| 0160092 | 8/1981 | German Democratic Rep. . |
| 52-50510 | 4/1977 | Japan . |
| 52-50511 | 4/1977 | Japan . |
| 1572586 | 7/1980 | United Kingdom . |
| 2123598 | 2/1984 | United Kingdom ................ 318/480 |

OTHER PUBLICATIONS

Gottlieb, "Electric Motors & Electronic Motor-Control Techniques," pp. 140-141 (1976).

Primary Examiner—Bentsu Ro
Attorney, Agent, or Firm—Spencer & Frank

[57] ABSTRACT

A brushless DC motor system includes a multi-pole DC motor having coils and permanent magnets. Optically scannable markers are applied on the circumference of a rotating member of the motor in fixed association with the magnets. By means of a scanner, these markers are converted to signals. These signals are evaluated with respect to their phase position and moment of commutation, and as a result commutation current is supplied to the coils.

11 Claims, 3 Drawing Sheets

BRUSHLESS DC MOTOR SYSTEM WITH OPTICALLY SCANNABLE MEMBER FOR COMMUTATION

BACKGROUND OF THE INVENTION

The present invention is directed to a brushless DC motor system, and more particularly to a motor system in which commutation is based upon an optically scannable member which is rotated by the motor. The invention is particularly useful for driving a head drum in a video tape recorder.

In prior art electronically commutating, multipole DC motors for driving record players, tape recorders, and video recorders, the coils are commutated as a function of signals emitted, for example, by Hall effect elements. The Hall effect elements are arranged stationarily in a certain association with the coils. The rotor is provided with the permanent magnet, and the Hall effect elements detect the polarity and magnitude of the field lines emitted by the permanent magnets. Depending on the structure of the motor, several Hall effect elements are required. Although Hall effect elements are able to detect polarity, they are too imprecise for phase regulation as required, for example, in video recorders.

Moreover, tachogenerators or frequency generators coupled to the motor shaft are required to regulate the number of revolutions, with their signals being evaluated in a servo system for control. Motors provided to drive a head drum in a video recorder additionally require a so-called pick-up pulse for phase control, i.e., for the association of the moment of magnetic head switching with the sync pulses of the video signal. This pick-up pulse must be generated at a fixedly given position of the head drum and thus also of the motor.

Circuits are also known for detecting the moment of commutation and the phase position. These circuits employ inductive magnetic field sensors. Hall effect elements as well as magnetic field sensors are relatively expensive and their detection capability at low motor rpm is relatively poor. Moreover, the signal amplitude emitted by these sensors is relatively low, so that much amplification is subsequently required for the evaluation.

SUMMARY OF THE INVENTION

It is an object of the present invention to provide a system for commutating a DC motor, with the number of revolutions per minute and the phase being regulated without a Hall effect element and without inductive magnetic sensors as well as without tachogenerators and frequency generators, and without pick-up pulse generators.

This and other objects, which will become apparent in the ensuing detailed description, can be attained by providing a system which includes a DC motor having a plurality of coils which receive commutation current, a rotatable member having an optically scannable code such as spaced-apart markers, a plurality of permanent magnets fixedly positioned with respect to the scannable code mounted along a circular path in the rotatable member opposite the coils so that the coils and magnets are spaced apart by gaps. The system also includes fixed scanner means for scanning the code to generate scanner signals having phase positions, and control means for evaluating the scanner signals with respect to their phase positions to determine the moment of commutation, and for supplying the commutation current to the coils.

In principle, the motor system of the invention employs optically scannable codes such as markers which are applied to the circumference of the rotatable member of the motor, and signals are derived from the codes for the respective moment of commutation. Preferably, the rotatable member includes a light-transmitting plastic ring to which the codes are applied in the form of light-impermeable bars having different widths, with the plastic ring being pushed over the rotor of the motor in a fixed association to the magnet poles of the rotor. It is also possible to make the rotor itself a light-transmitting plastic member in which the permanent magnets of the motor are arranged in a ring. The optically scannable codes are then applied to the circumference of the plastic member. The edge of the plastic ring bearing the codes then enters into the fork of an optocoupler, or photoelectric barrier detector.

For evaluation of the codes it is necessary to be able to detect three different position states of the rotor. This is accomplished by using code markers in the form of light-impermeable bars of different width, with each required moment of commutation being associated with a respective bar. To define a starting or zero position, one marker is significantly wider than the remaining markers. For example, for a three-phase motor having star connected windings on 12 poles in the stator and four pairs of poles (=8 poles) in the rotor, detection is possible if 8×3=24 markers are arranged over the circumference of 360° with their leading edges spaced uniformly. The width of 23 of the 24 markers is such that, with the motor not running and with one of these 23 markers disposed in the beam path of the photoelectric barrier detector, the beam path is not interrupted completely as it would be for the 24th marker. The photocurrent is thus reduced to a fraction, so that the output signal from the photoelectric barrier detector has a defined level between a bright and a dark value.

The association of the pulses picked up by the optical barrier detector for exact control of the moment of commutation can be evaluated by a microprocessor whereby the optical barrier detector is fixedly positioned with respect to the stator coils. If phase matching is required, for example for use in head drum drives, this can be effected with the aid of delay times that are stored in the microprocessor, as disclosed, for example, in German Patent Application P No. 35 28 452.8.

DESCRIPTION OF THE PREFERRED EMBODIMENT

Figure 1:
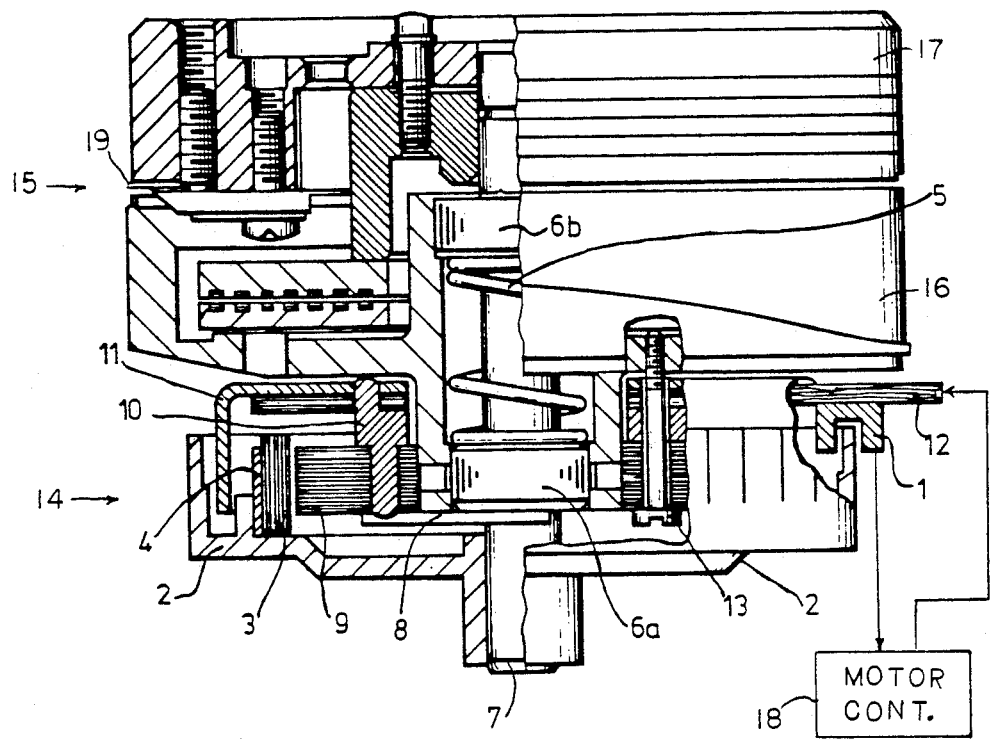
FIG. 1 is a front view, partially in section, showing an electronically commutatable DC motor system in accordance with the present invention in conjunction with a head drum for a video recorder.

FIG. 1 shows an electronically commutatable DC motor 14 in conjunction with a head drum 15 for a video recorder. The stator of the motor 14 is connected with the lower, stationary portion 16 of the head drum by means of a screw 13. Motor 14 serves to rotate portion 17 of head drum 15 with the magnet heads 19. The stator is formed by a stator iron core 9 on which twelve commutatable stator coils 20 (shown in FIG. 4) are disposed. The stator iron core 9 is connected by means of the screw 13 and by way of an electrically insulating spacer 10 and a circuit board 12, with a shielding motor housing 11. Circuit board 12 projects out of the motor 14 through an opening in motor housing 11, and supports a forked photoelectric barrier detector 1. Detector 1 includes a light-emitting element (such as an LED, not shown) in one arm of the fork and a light-receiving element (such as a phototransistor, not shown) in the other arm. These arms are separated by a slot, and it will be apparent that the light beam from the light-emitting element to the light-receiving element will be interrupted if an opaque barrier enters the slot. A motor controller 18 receives the signals from detector 1 and provides the commutation current for the stator coils by way of circuit board 12. Motor controller 8 is shown apart from circuit board 12 in FIG. 1 for purpose of illustration only; preferably, some or all of the electrical components for controller 18 are mounted on circuit board 12 and connected by printed circuit lines (not illustrated) thereon.

The edge of rotor member 2, which is provided with codes (see reference numbers 23 and 24 in FIG. 2) projects into the fork of the forked photoelectric barrier detector 1. A ring of permanent magnets 3, surrounded by a return ring 4 made of soft iron, is fastened to rotor member 2, shown in FIG. 4. The rotor member 2 is fixed to motor shaft 7, whereby marker 24 (see the reference number in FIG. 2) is fixedly positioned with respect to the magnetic heads.

The rotor is mounted by means of a so-called integral spindle 5. This spindle offers the advantage, in addition to highly accurate revolutions and easy installation, that the bearing tension is applied between outer ball bearing rings 6a and 6b by way of a spring. In this way, it is not necessary, in connection with such a bearing, to apply external pressure exerted to the inner races of the ball bearing rings 6a and 6b. Because of this advantage, rotor member 2 can be pressed directly onto shaft 7 or can be fastened in any other force or form locking manner.

A further advantage of such a spindle 5 is that shaft 7 is exposed between rotor member 2 and bearing ring 6a, and it is thus possible to provide contact for the grounding spring 8 required for head drum 15.

Figure 2:
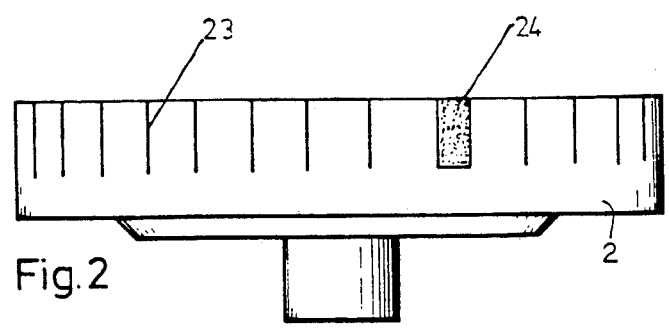
FIG. 2 is a front view of a rotor with markers applied to its exterior.

FIG. 2 shows rotor member 2 with codes in the form of markers applied to its exterior. The rotor member 2 is composed of a light transmitting plastic material. Markers are applied to its exterior in the manner shown. One marker 24 is wider than the other markers 23. Marker 24 serves to detect the starting or zero position required for the further build-up of a control signal for the commutation of the coils. Moreover, one or more pulses required for switching the magnetic heads 19 during one revolution of head drum 15 are derived from marker 24.

Figure 3:
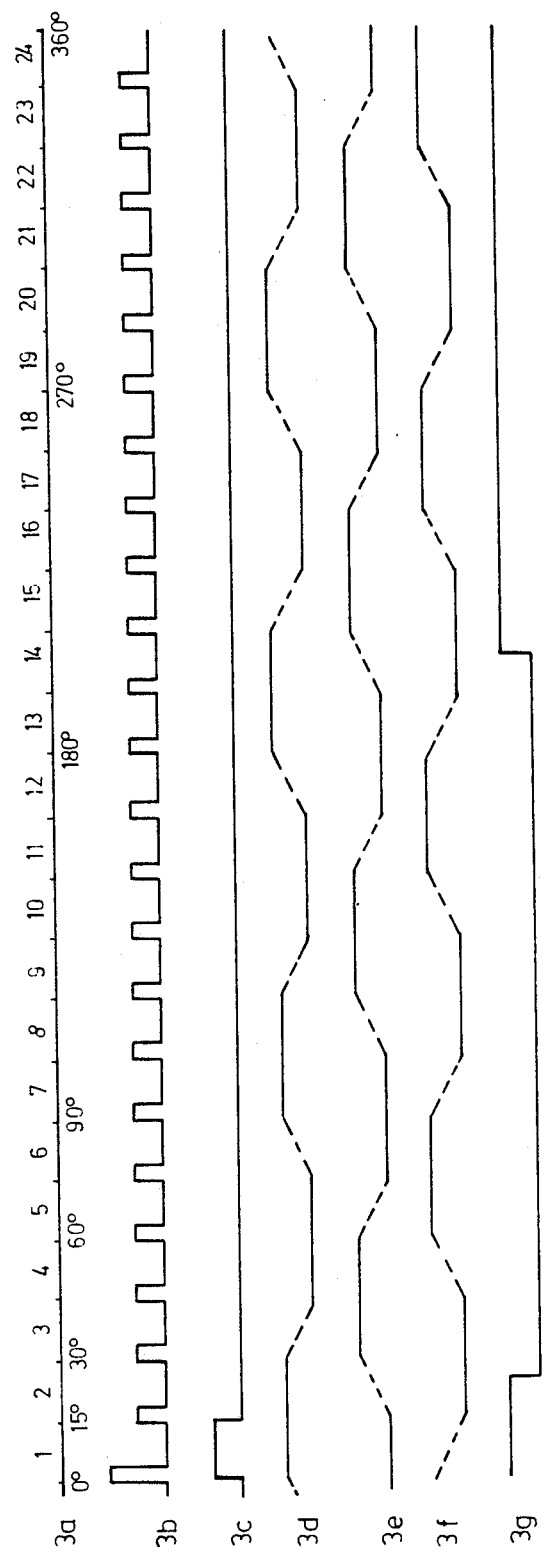
FIG. 3 is a timing diagram for commutation and for the generation of head switching pulses.

FIG. 3 is a timing chart for commutation and the generation of head switching pulses.

FIG. 3a shows a scale in which 24 clock times are plotted over a circumference of 360°. These 24 clock times are required to commutate a three-phase twelve coil arrangement having four magnetic pole pairs in the rotor. These clock times are generated when photoelectric barrier detector 1 scans a marker 23 or 24 at the circumference of the rotor member 2.

FIG. 3b shows the amplitude curve. The first pulse has a relatively high amplitude and is generated during rotation of rotor member 2 as a result of the broad marker 24. The leading edges of the pulses are equidistant.

FIG. 3c shows the signal emitted by a microprocessor in order to realize motor action in phase synchronism with the video signal to be recorded. This pulse is equivalent to a pulse generated, for example, by a pick-up pulse generator in prior art video recorders.

The illustrations in FIGS. 3d, 3e and 3f show the turn-on times derived from FIG. 3b with the associated polarities of the individual coils of the three-phase arrangement. The transitions from one polarity to the other polarity are shown in dashed lines.

FIG. 3g shows the head switching signal pulses required for a video recorder. The head switching signal pulses can be generated with the aid of a microprocessor. Their association with the first pulse of FIG. 3b is controlled by delay times stored in the microprocessor. These delay times result from tuning the recorder, for example, with the aid of a standard band.

Figure 4A:
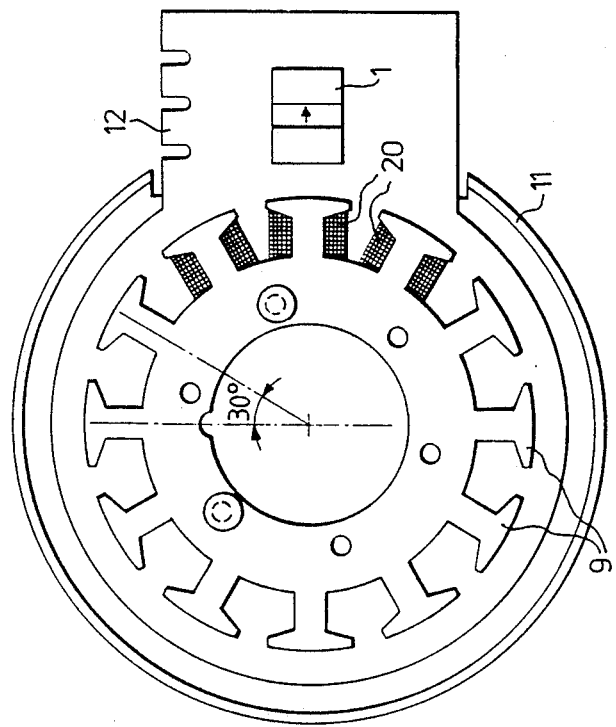
FIGS. 4A and 4B illustrate the stator of the DC motor system.
Figure 4B:
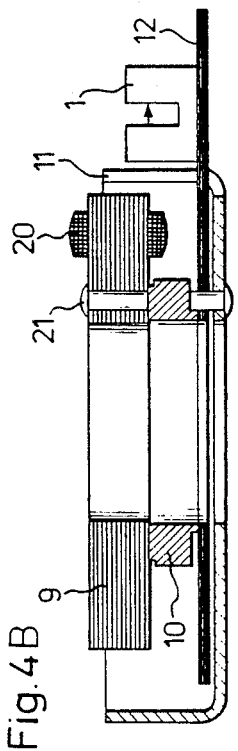

FIGS. 4A and 4B show the stator of a DC motor system. Twelve electronically commutatable coils 20 are arranged on an iron core 9, each under an angle of 30°. A forked photoelectric barrier detector 1 is fastened on a circuit board 12 in fixed association with the coils. Circuit board 12 projects out of the stator through an opening in motor housing 11. In addition to the forked photoelectric barrier detector 1, it accommodates non-illustrated parts of the electronic system for the motor. Iron core 9 with coils 20 is combined into one unit with motor housing 11 and circuit board 12 by way of an insulating spacer member 10 and a rivet connection 21. The arrow in forked photoelectric barrier detector 1 represents the light beam which, when the motor is completely assembled, is interrupted by the light impermeable markers 23, 24 of light transmitting rotor member 2.

Figure 5A:
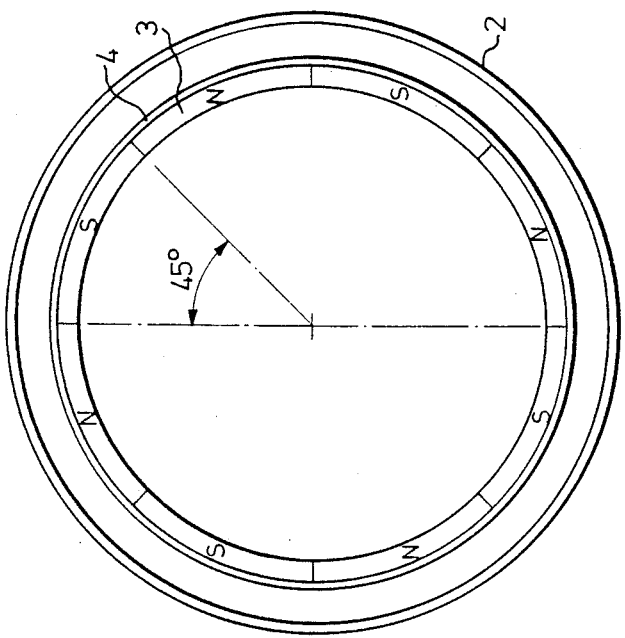
FIGS. 5A and 5B illustrate the rotor of the DC motor system.
Figure 5B:
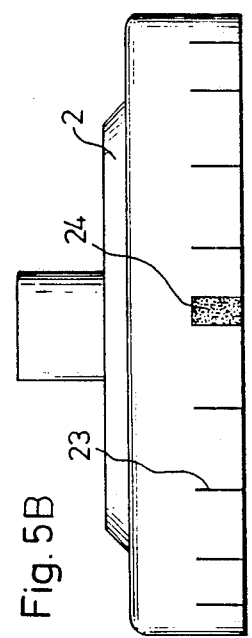

FIGS. 5A and 5B show the rotor of a DC motor system. In the light transmitting rotor member 2 provided with markers 23, 24, a magnet ring 3 is disposed which includes eight magnets of alternating N, S polarity. The magnets are each fastened at an angle of 45°. They are surrounded by a return ring 4 composed of soft iron. During assembly, markers 23, 24 of rotor member 2 are oriented in a fixed association with the changes from one polarity to the other polarity of the magnets so that a flank of a marker 24 of the markers subdivided in 15° steps coincides with a change in polarity.

The present disclosure relates to the subject matter disclosed in Federal Republic of Germany patent application P No. 36 04 238.2 of Feb. 11th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What we claim is:

1. A brushless DC motor system, comprising:
   a DC motor which includes a plurality of stator coils to receive commutation current, a rotatable member having an optically scannable code, and a plurality of permanent magnets, fixedly positioned with respect to the scannable code, mounted along a circular path in the rotatable member opposite the coils so that the coils and magnets are spaced apart by gaps;

fixed scanner means with respect to the stator coils for scanning the code to generate scanner signals having phase positions; and control means for evaluating the scanner signals with respect to their phase positions to determine the moment of commutation, and for supplying the commutation current to the coils, wherein the motor requires n commutation steps during each revolution, n being an integer greater than 1, wherein the rotatable member is composed of a rotationally symmetrical light-transmitting plastic element which includes a ring with an edge bearing the scannable code, the scannable code including a plurality of light-impermeable equidistant zones on the ring, the light-impermeable zones being distributed around the circumference of the ring, each light-impermeable zone corresponding to respective commutation step, and wherein there are n-1 first light-impermeable zones and one second light-impermeable zone, the second light-impermeable zone being shaped differently than the first light-impermeable zones.

2. The system of claim 1, wherein the scanner means comprises a photoelectric barrier detector having an optical emitter and an optical receiver, and wherein the edge bearing the scannable code is disposed between the optical emitter and optical receiver.

3. The system of claim 2, wherein the magnets are fastened to the plastic element in a ring-shaped arrangement, fixed with respect to the scannable code.

4. The system of claim 2, further comprising a head drum for a video recorder, the head drum being driven by the motor.

5. The system of claim 1, wherein the scanner means comprises a photoelectric barrier detector having an optical emitter and an optical receiver, and wherein the motor further comprises a housing that is spaced apart from the magnets by an annular gap, one of the optical emitter and optical receiver of the photoelectric barrier detector being disposed in the gap between the housing and the magnets.

6. The system of claim 1, wherein the permanent magnets are mounted on the plastic element.

7. A brushless DC motor system, comprising:
a DC motor which requires a plurality of commutation steps during each revolution and which includes
a rotatably mounted shaft,
a unitary light-transmitting plastic element having a cylindrical sleeve portion which mounts the element on the shaft, having an intermediate portion which extends radially outward from the sleeve portion, and having a cylindrical outer portion which is connected to the intermediate portion at a position that is spaced apart from the sleeve portion, the outer portion being coaxially disposed with respect to the sleeve portion and bearing an optically scannable code, the optically scannable code including a plurality of light-impermeable equidistant zones on the outer portion of the plastic element, the light-impermeable zones being distributed around the circumference of the outer portion, each light-impermeable zone corresponding to a respective commutation step, a plurality of fixedly mounted stator coils to receive commutation current, the stator coils being disposed between the shaft and the outer portion of the plastic element, a plurality of permanent magnets, and means for mounting the permanent magnets on the plastic element, the permanent magnets being disposed along a circular path adjacent the stator coils so that the coils and magnets are spaced apart by gaps;

fixed scanner means with respect to the stator coils for scanning the code to generate scanner signals having phase positions; and control means for evaluating the scanner signals with respect to their phase positions to determine the moment of commutation, and for supplying the commutation current to the coils, wherein there are n commutation steps, n being an integer, and wherein there are n-1 first light-impermeable zones and one second light-impermeable zone, the second light-impermeable zone being shaped differently than the first light-impermeable zones.

8. The system of claim 7, wherein the scanner means comprises a photoelectric barrier detector having an optical emitter and an optical receiver, and wherein the photoelectric barrier detector is disposed so that the outer portion of the plastic element lies between the optical emitter and the optical receiver.

9. The system of claim 8, wherein the motor further comprises a housing that is spaced apart from the magnets by an annular gap, one of the optical emitter and optical receiver of the photoelectric barrier detector being disposed in the gap between the housing and the magnets.

10. The system of claim 7, wherein the plastic element further includes a projecting portion connected to the intermediate portion at a position spaced inward from the outer portion, and wherein the means for mounting the permanent magnets on the plastic element includes means for mounting the permanent magnets on the projecting portion.

11. A brushless DC motor system, comprising:
a DC motor which includes
a rotatably mounted shaft,
a unitary light-transmitting plastic element having a cylindrical sleeve portion which mounts the element on the shaft, having an intermediate portion which extends radially outward from the sleeve portion, and having a cylindrical outer portion which is connected to the intermediate portion at a position that is spaced apart from the sleeve portion, the outer portion being coaxially disposed with respect to the sleeve portion and bearing an optically scannable code, a plurality of fixedly mounted stator coils to receive commutation current, the stator coils being disposed between the shaft and the outer portion of the plastic element, a plurality of permanent magnets, and means for mounting the permanent magnets on the plastic element, the permanent magnets being disposed along a circular path adjacent the stator coils so that the coils and magnets are spaced apart by gaps;

fixed scanner means with respect to the stator coils for scanning the code to generate scanner signals having phase positions; and control means for evaluating the scanner signals with respect to their phase positions to determine the moment of commutation, and for supplying the commutation current to the coils, wherein the optically scannable code includes a plurality of spaced-apart, elongated markers borne by the outer portion of the plastic element, the markers being disposed parallel to the shaft, one of the markers having a thickness that is substantially greater than the rest.

* * * * *